Jan. 31, 1939. J. TJAARDA 2,145,670
SWINGING HALF-AXLE SUSPENSION
Filed Feb. 1, 1936 2 Sheets-Sheet 1

INVENTOR.
John Tjaarda.
BY
Dukes, Calver & Gray
ATTORNEYS.

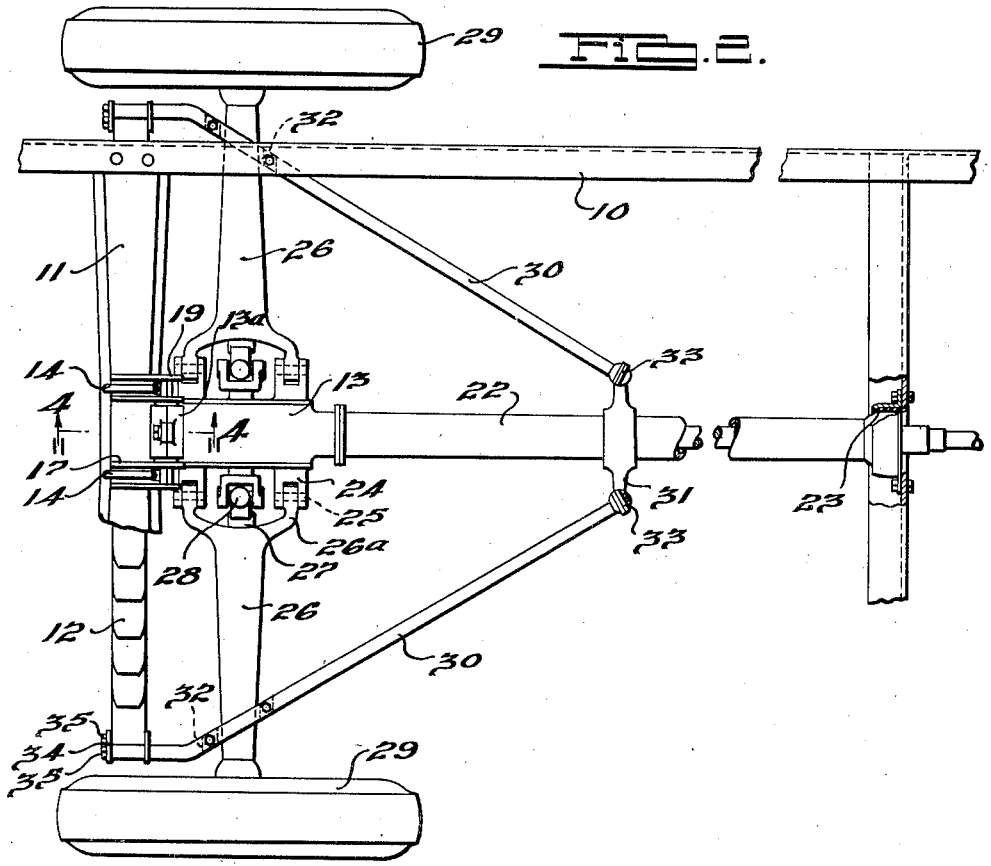
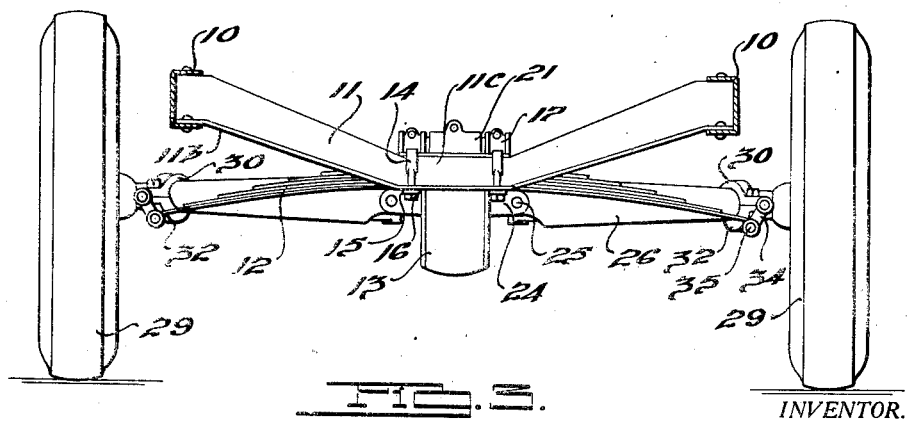

Patented Jan. 31, 1939

2,145,670

UNITED STATES PATENT OFFICE 2,145,670

SWINGING HALF-AXLE SUSPENSION

John Tjaarda, Birmingham, Mich., assignor to Briggs Manufacturing Company, Detroit, Mich., a corporation of Michigan Application February 1, 1936, Serial No. 61,861

4 Claims. (Cl. 180—73)

This invention relates to rear end suspensions for automobiles, and particularly that form of independent springing for rear wheels known as the swinging half-axle type.

One of the principal objects of this invention is to provide a spring suspension of the swinging half-axle type with a transverse spring in which no part of the suspension, except the wheels, projects up or down above or below the final drive housing, thus permitting a low location of the body and seats of the car.

Another object of this invention is to provide an independent spring suspension for the driving wheels of a car using a leaf spring and having a minimum number of articulations and universal joints.

Another object of this invention is to provide an independent spring suspension for the driving wheels of the car in which the moving parts carrying the wheels are securely braced so that they can be light and yet resist shocks and other loads.

Another object of this invention is to provide a spring suspension for the driving wheels of a car in which the entire weight of the differential and propeller shaft and half of the weight of the axle shafts and housings are carried by the frame.

Another object of this invention is to provide a spring suspension with a differential carried by the frame and in which the wheels are loaded directly from the frame and are accurately guided with respect to the differential although the latter is insulated from the frame by sound deadening material.

Another object of this invention is to provide a suspension and a drive for an automobile in which the final drive housing is supported on the frame of the car and in which the housing and the wheels are sound insulated from the frame by sound deadening material.

Another object of this invention is to provide a suspension and a drive for an automobile in which the final drive housing is supported on the same frame of the car and in which the same sound insulating material serves to insulate both the final drive and the wheels from the frame.

Other objects of this invention will appear in the following description and appended claims, reference being had to the accompanying drawings forming a part of this specification wherein like reference characters designate corresponding parts in the several views.

Fig. 2 is a plan view.

Fig. 3 is a rear elevation.

Figure 1:
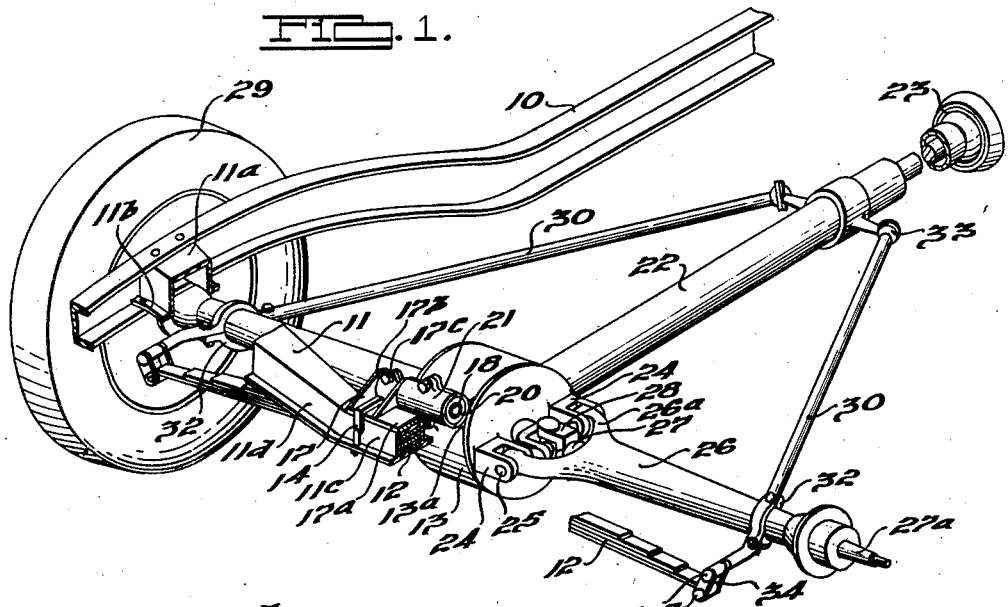
Fig. 1 is a perspective view of a preferred embodiment of the invention with parts broken away to more clearly show portions that would otherwise be hidden.
Figures 4, 5:
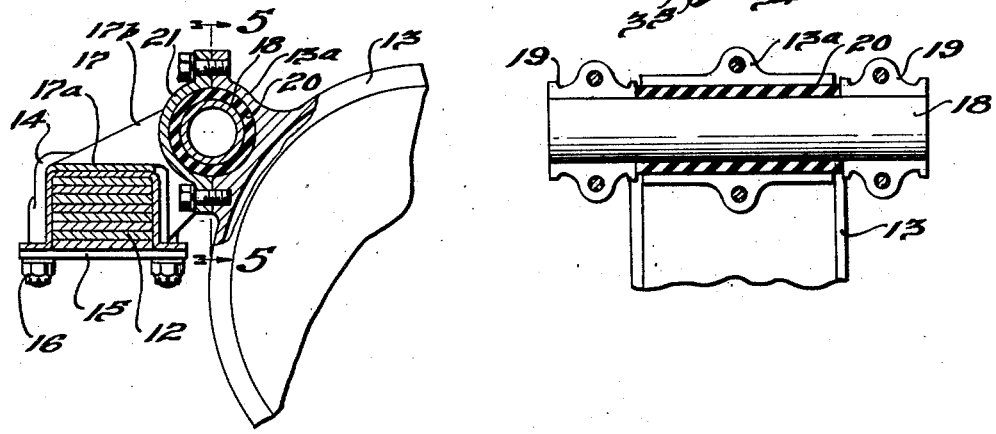
Fig. 4 is a section on the line 4—4 of Fig. 2 taken in the direction of the arrows.
Fig. 5 is a section on the line 5—5 of Fig. 4 taken in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As shown in the drawings one embodiment of the invention comprises an automobile frame having side rails or frame sills 10 connected together at the rear by a cross member 11 which is in the form of a flanged channel opening downward, the ends of the web 11a of the channel being riveted to the upper flanges of the side rails 10 and the ends of the flanges 11b of the channel being riveted to the lower flanges of the side rails 10. The cross member 11 comprises a central horizontal section 11c situated between two upwardly sloping portions 11d, so that the central portion 11c is substantially lower than the side rails 10 to which the ends of the cross member 11 are attached.

The horizontal central portion 11c of the cross member carries a transverse spring 12, which is the rear spring of the car, and the housing 13 enclosing the final drive and differential. The central part of the spring 12 fits up into the central part 11c of the channel shaped cross member 11 and is secured in place by a pair of U-bolts 14 which extend over the cross member 11 and down through holes in the flanges 11b and through plates 15 which are pressed up against the bottom of the spring by nuts 16.

The U-bolts 14 also serve to secure to the frame a bracket 17 which carries the final drive and differential housing 13. The bracket 17 comprises a flat plate 17a which extends along the top of the central portion 11c of the cross member 11 and under the U-bolts 14. Formed integrally with or welded to the plate 17a are four vertical webs 17b, one at each side of each of the two U-bolts 14, which extend forward and carry a pair of semi-cylindrical clamping portions 17c which receive the ends of a transverse tube 18. The tube 18 is held in place by two caps 19 bolted to the bracket 17 and clamping the ends of the tube.

The central portion of the tube 18 is surrounded by a thick rubber sleeve 20 whose ends abut the ends of the clamping portions 17c of the bracket 17 and the ends of the caps 19. The major portion of the rubber sleeve is tightly enclosed in a split cylinder formed by a cap 21 and a bracket 13a on the differential housing 13. The long resilient bearing thus formed provides most of the support for the differential housing 13 and for the parts within or connected to it. The length of the bearing prevents any appreciable movement of the housing about the longitudinal axis of the car under the torque applied to it from the propeller shaft, and its size prevents appreciable movement bodily in any direction.

Rotation of the differential housing 13 about a vertical axis or about the axis of the rubber support 20 is prevented by a torque tube 22 fastened to the housing 13 and enclosing the propeller shaft, the forward end of the torque tube being supported in a rubber bushing 23.

Each side of the differential housing is provided with a pair of small yokes 24 containing axially alined bearings parallel to the longitudinal axis of the car. Each pair of yokes carries a pair of pins 25 upon which are pivoted the ends of the two arms 26a forming part of the forked inner end of a swinging half-axle housing 26 extending out transversely from the final drive housing 13.

Each half-axle housing 26 has within it a half-axle shaft 27 whose inner end is connected to one side of the differential through a universal joint 28 placed between and in line with the pair of pins 25 securing the half-axle housing 26 to the final drive housing 13. The outer end 27a of the shaft is secured to a wheel 29 rotatably mounted at the outer end of the half-axle housing, the shaft and wheel being supported on the housing by any suitable arrangement of bearings. Such arrangements include one bearing between the shaft and the half-axle housing near the inner end and a second bearing between the outer end of the housing and either the shaft or the wheel, the shaft and the wheel being rigidly secured together, or a pair of bearings between the housing and the wheel as in a full floating axle.

The outer ends of the half-axle housings 26 are rigidly braced against fore and aft movement by radius rods 30 pivoted to a bracket 31 on the torque tube some distance ahead of the final drive housing 13 and bolted to brackets 32 welded on to the housings 26 near their outer ends. The pivots 33 between the front ends of the radius rods 30 and the torque tube 22 lie on the prolonged axes of the pivot pins 25 connecting the half-axle housings 26 to the differential housing 13 and may be cylindrical bearings coaxial with them and arranged to take axial loads, but they are preferably rubber lined ball and socket joints, a rubber lined joint being used to eliminate the need of greasing and a ball and socket joint being used because that type of rubber joint is better adapted to take thrust than other forms of rubber joints.

The radius rods extend back past the half-axle housings and carry spring shackles 34 at their ends by means of which the leaf spring 12, extending across the car in back of the final drive housing 13, is connected to the half-axles 26.

The radius rods 30 thus form levers fulcrumed at their forward ends, and transmit the weight of the car from the transverse spring 12 to the half-axle housings 26.

The pins 35 of the spring shackles 34 are parallel to the pivots 25 between the half-axle housings 26 and the differential housing 13. The spring shackle pins 35 in this suspension, unlike the spring shackle pins in the ordinary transverse spring suspension with axle and radius rods or in the ordinary semi-elliptic spring suspension, remain parallel with their original position with respect to the center of the spring. Therefore, the only forces exerted on the spring 12 by the shackles 34 are forces tending only to bend the spring, and there is no twisting of the spring. This lessens the stresses in the spring, without changing its load carrying characteristics, and reduces the bearing loads and the resultant wear on the spring shackle pins 35.

A study of the above described suspension will show that each wheel can rise and fall with respect to the frame without influencing the other in any way; the suspension is independent. The unsprung weight has been reduced to a minimum, the total being about equal to the weight of the wheels and brakes and the weight of outer halves of the half-axle shafts, half-axle housings, the radius rods, and transverse spring. The entire weight of the torque tube, propeller shaft, final drive and differential gearing, differential housing, and universal joints is sprung. Road noises and gear rumble cannot be telegraphed to the frame and body as they can be through the linkage of ordinary independent suspensions because there is no continuous metal path, uninterrupted by rubber, between the wheel bearings or the gears in the differential housing and the frame except through the leaf spring. The effect of the leaf spring in this connection is unimportant because such springs, on account of the dampening effect of their interleaf friction, do not transmit noises. If desired, the spring shackles may have rubber bushings to more effectively block the transmission of road rumble through the spring.

While I have illustrated and described in detail only one embodiment of my invention, the scope of this application is not limited thereby but includes all modifications falling within the terms of fair interpretation of any of the appended claims. Such modifications include, among others, securing the radius rods to the brake backing plates instead of directly to the half-axle housings or placing the transmission in same housing as the final drive and differential.

I claim:

1. In a motor vehicle, a frame, a final drive housing secured thereto, a pair of half-axles pivotally connected to the housing for angular vertical movement about longitudinal axes, a transverse leaf spring connected to the frame, a longitudinally extending torque member secured to the housing, and radius rods pivoted at corresponding ends thereof to said torque member on the extended axes of angular movement of the axles, said rods being connected at intermediate points thereof to the axles and the opposite ends of the rods being pivotally connected to the ends of said spring.

2. In a motor vehicle, a frame, a final drive housing secured thereto, a pair of half-axles pivotally connected to the housing for angular vertical movement about longitudinal axes, a transverse leaf spring connected to the frame, a longitudinally extending torque member secured to the housing, and radius rods pivoted at corresponding ends thereof to said torque member on the extended axes of angular movement of the axles, said rods being connected at intermediate points thereof to the axles and the opposite ends of the rods being pivotally connected to the ends of said spring on axes parallel to said longitudinal axes.

3. In a motor vehicle, a frame, a final drive housing and a torque tube rigidly secured together and resiliently mounted on the frame, a pair of half-axles, means for pivotally supporting the half-axles from the final drive housing and the torque tube for swinging up and down about horizontal axes extending longitudinally of the frame near its center line, diagonal radius rods secured to the half-axles and having their inner ends pivotally supported from the torque tube on the extended axes of swinging of the half-axles, and a transverse leaf spring having its center secured to the frame and its ends secured to the radius rods, the spring being at the same level as the half-axles.

4. In a motor vehicle having a frame and a sprung final drive, a cross frame member, a final drive housing in front of the cross frame member, a torque tube extending lengthwise of the vehicle and rigidly fastened to the housing, a second cross frame member located in front of said housing and spaced therefrom, spaced elongated concentric cylindrical members extending transversely of the vehicle, one of the concentric members being secured to the first cross frame member and the other being secured to the final drive housing, a rubber sleeve between the concentric members, and sound absorbing means for supporting the torque tube on the frame at a point spaced from the final drive housing, said point of support being located on said second cross frame member.

JOHN TJAARDA.